United States Patent [19]
Moore

[11] 4,391,209
[45] Jul. 5, 1983

[54] EXOTHERMIC CUTTING ELECTRODE

[75] Inventor: Paul E. Moore, Lancaster, Ohio

[73] Assignee: Arcair Company, Lancaster, Ohio

[21] Appl. No.: 274,118

[22] Filed: Jun. 16, 1981

[51] Int. Cl.³ .............................................. F23B 7/00
[52] U.S. Cl. .................................. 110/349; 266/225; 431/99
[58] Field of Search ................... 266/225; 110/349; 431/99

[56] References Cited

U.S. PATENT DOCUMENTS

| | | | |
|---|---|---|---|
| 2,345,758 | 4/1944 | Lincoln et al. | 219/10 |
| 2,806,128 | 9/1957 | Muller | 219/146 |
| 3,147,362 | 9/1964 | Ramsey et al. | 219/146 |
| 3,260,076 | 7/1966 | Homberg | 67/34 |
| 3,487,791 | 1/1970 | Dalm | 110/1 |
| 3,500,774 | 3/1970 | Meier | 110/1 |
| 3,507,230 | 4/1970 | Beib | 110/1 |
| 3,507,231 | 4/1970 | Meier | 110/1 |
| 3,570,419 | 3/1971 | Brandenberger | 110/1 |
| 3,591,758 | 7/1971 | Clucas | 219/70 |
| 3,602,620 | 8/1971 | Fassler | 431/99 |
| 3,738,288 | 6/1973 | Brandenberger | 110/1 |
| 3,751,625 | 8/1973 | Hummel et al. | 219/70 |
| 4,069,407 | 1/1978 | Brower | 219/70 |
| 4,182,947 | 1/1980 | Brower | 219/70 |

*Primary Examiner*—Edward G. Favors
*Attorney, Agent, or Firm*—James C. Simmons; E. Eugene Innis

[57] ABSTRACT

An exothermic cutting electrode or burning bar having an oxidizable metal fluid conduit (tube) surrounded by a mass of metal similar to that of the fluid tube, the entire structure covered with an outer oxidizable metallic tube and/or an electrically insulating water impervious cover, either end of the electrode being adapted for connection to a source of oxidizing fluid and electric current, so that, an arc can be struck between a workpiece and the free end of the electrode to produce a cutting flame. By proper selection of the type and mass of the materials of construction the electrode will burn after the electric current has been turned off.

16 Claims, 9 Drawing Figures

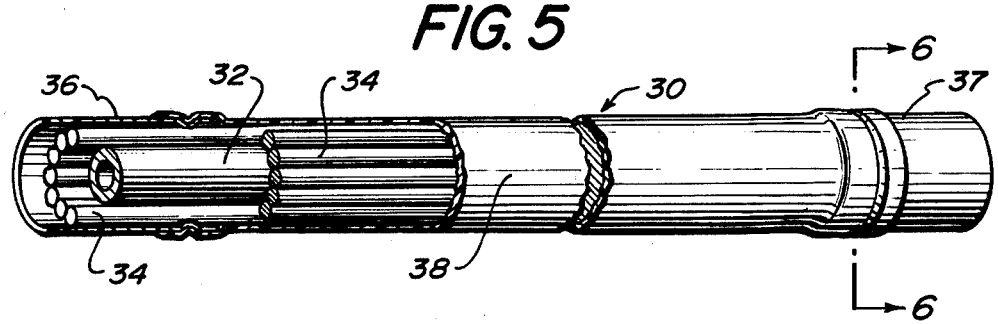
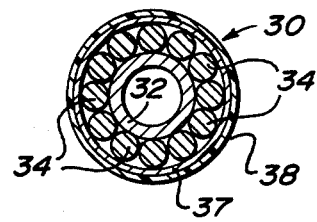
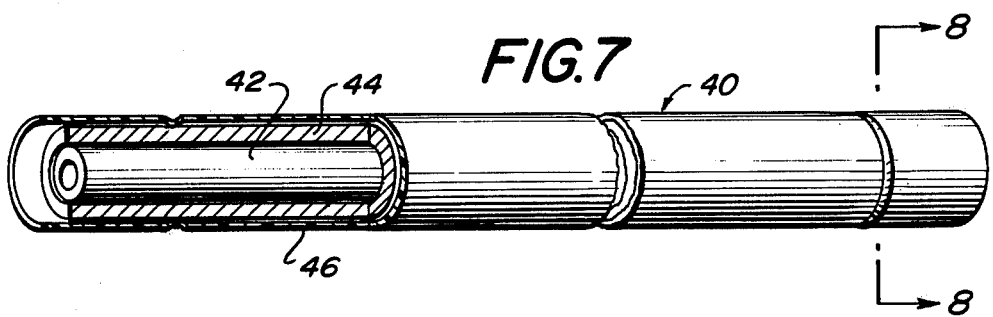
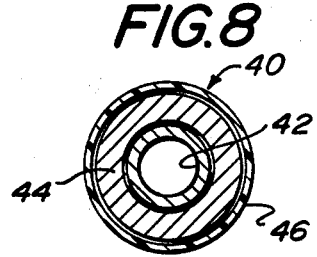
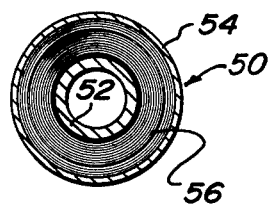

EXOTHERMIC CUTTING ELECTRODE

TECHNICAL FIELD

This invention pertains to exothermic cutting electrodes or burning bars of the type wherein a mass of metal is ignited in the presence of an oxidizing gas (e.g. oxygen) to form a flame or products of combustion which can be directed at a structural shape for cutting or piercing the structural shape.

BACKGROUND OF THE PRIOR ART

Conventional burning bars which are used on land for cutting structural materials such as rock, stone, concrete, iron and steel are disclosed in any of U.S. Pat. Nos. 3,260,076; 3,507,231; 3,487,791; 3,500,774; 3,507,230; 3,570,419; and 3,738,288. These burning bars share a common feature in that they have an outer tube within which is placed a plurality of elongated rods or wires to make up a mass of oxidizable metal. Oxygen is conducted down through the outer tube to the end of the rod where combustion is initiated to produce a flame which is directed at the structural material. The prefered burning bars usually contain a readily oxidizable metal (e.g. magnesium or aluminum) as one or more of the rods to promote combustion.

The use of multiple strands in various configurations for arc welding electrodes is shown in U.S. Pat. Nos. 1,773,653; 2,345,758; 2,806,128 and 3,147,362 it being well known that welding electrodes are generally unsuitable for cutting operations.

Twisted wire or cable type burning bars or thermal lances are shown in U.S. Pat. Nos. 3,591,758; and 3,602,620.

Lastly, the multiple wire burning bar has been adapted to underwater use as shown in U.S. Pat. Nos. 4,069,407 and 4,182,947. The underwater rods of the aforementioned patents have an outer tube within which are disposed a plurality of elongated steel rods or wires the wire bundle including a readily oxidizable metal rod which is preferably aluminum.

BRIEF SUMMARY OF THE INVENTION

The present invention pertains to exothermic cutting electrodes or burning bars as they are known in the art. In particular the present invention provides an electrode having a central (inner) tube or oxygen passage around which is disposed a mass of similar metal. The mass of metal is held to the inner tube in a number of ways the most prevalent being the use of an outer tube. However, ferrules can be crimped to the mass of metal to hold it to the inner tube and the entire length between the ferrules can be covered with a water impervious electrically insulating coating to provide the outer surface of the electrode. The inner tube and mass of metal can be steel which is readily obtainable and easily fabricated which in the presence of oxygen conducted down the center tube will permit the establishment of a flame which can be directed against materials of construction to accomplish a cutting, boring, piercing or other severing operation. The inner or center tube insures that a jet of oxidizing gas and flame hits the workpiece with a concentrated force. According to the present invention the electrodes are constructed so that an electrical current passed down through the mass of metal can be used to heat the end of the electrode in the presence of the stream of oxygen, to its ignition temperature and thus start the progressive burning of the electrode mass producing a very high temperature flame. By proper selection of the metal and the proper relationship between the metal mass and metal surface in contact with the stream of oxygen (oxidizing gas), the current can be turned off once the flame from the burning mass of metal is established and the cutting can continue until the electrode is consumed.

BRIEF DESCRIPTION OF THE DRAWING

FIG. 5 is a perspective partially sectioned view of another embodiment of the present invention.

FIG. 6 is a view taken along the lines 6—6 of FIG. 5.

FIG. 7 is a perspective view of another embodiment of an electrode according to the present invention.

FIG. 8 is a view taken along the lines 8—8 of FIG. 7.

FIG. 9 is a cross-sectional view of an alternate embodiment of the electrode of FIG. 7.

DETAILED DESCRIPTION OF THE INVENTION

An exothermic electrode or burning bar according to the present invention provides a mass of oxidizable metal that in the presence of an oxidizing gas (e.g. oxygen) and a source of ignition will produce a flame which can be directed against a workpiece which may be part of a fixed land structure or marine structure or similar object so that in the hands of the skilled operator a cutting, piercing or burning operation can take place. Electrodes according to the present invention can be used to burn, cut or pierce structural materials in air or water such as cast iron, steel, concrete and rock, the latter being either natural or synthetic.

Figure 1:
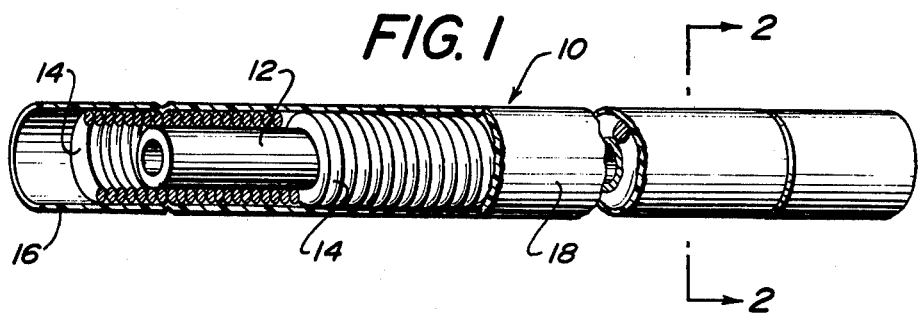
FIG. 1 is a partially fragmented perspective view illustrating an electrode according to the present invention.
Figure 2:
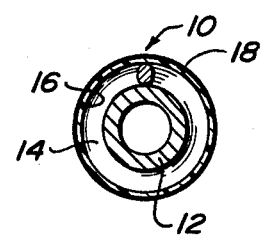
FIG. 2 is a view taken along the lines 2—2 of FIG. 1.

One form of the invention is shown in FIGS. 1 and 2, the electrode shown generally as 10 comprising an inner tube 12 the inner tube being of a low carbon steel 17½ inches (~44.45 cm) long having a 0.156 inches (~3.96 mm) outside diameter and a 0.100 inches (~2.54 mm) inside diameter. Wrapped around tube 12 in a helical fashion is a continuous length of low carbon steel wire 14 having a nominal diameter of 0.35 inches (~8.89 mm). The steel wire is wound in such a fashion as to define a tube having a 0.235 inches (~5.97 mm) outside diameter and a 0.165 inches (~4.2 mm) inside diameter with an overall length of 17¾ inches (~45.09 cm). Wire 14 is wound so that it projects approximately 0.125 inches (~3.18 mm) over the ends of inner tube 12. Disposed around the wire 14 is an outer tube 16 having an outside diameter of 0.312 inches (~7.93 mm) and an inside diameter of 0.2425 inches (~6.16 mm) with an overall length of 18 inches (~45.72 cm). As shown in the drawing on the torch end of the electrode the outer tube 16 projects beyond wire 16 and wire 16 beyond inner tube 12. On the burning end the three components can be flush.

The entire electrode 10 can then be coated with 0.015-0.020 inches (~3.81 mm-~5.08 mm) of an electrically insulating material such as a vinyl sold by Michigan Chome and Chemical Company under the trade name MICRON 455 Vinyl. In use a portion of one end of the plastic coating can be stripped away so that the electrode can be clamped in a torch (not shown) such as disclosed in U.S. Pat. No. 3,780,258 for use under water. Alternatively, the electrode can be fabricated by clamping the outer tube in a fixture which will prevent adherence of the coating as it is applied.

Set forth in Table I are a series of tests performed under water wherein electrodes according to that shown in FIGS. 1 and 2 were tested against electrodes shown in U.S. Pat. No. 4,069,407.

TABLE #1

| TEST[1] NO. | AMP | INCHES ELECT. USED | TOTAL ARC-TIME MIN. | LENGTH OF CUT INCHES | INCHES CUT PER INCHES OF ELEC. | INCHES CUT PER MINUTE ARCTIME | THICKNESS OF MATERIAL[2] |
|---|---|---|---|---|---|---|---|
| 1P | 300 | 14.875 (37.78)[3] | .566 | 8.75 (22.23) | .588 (1.49) | 15.45 (39.24) | 1½" (3.81) |
| 1I | 300 | 9.25 (23.49) | .504 | 9.75 (24.77) | 1.059 (12.69) | 19.35 (49.15) | 1½" (3.81) |
| 2P | 300 | 15.00 (38.1) | .575 | 9.125 (23.18) | .608 (1.54) | 15.86 (40.28) | 1½" (3.81) |
| 2I | 300 | 10.770 (27.35) | .498 | 9.437 (23.96) | .894 (2.27) | 19.13 (48.59) | 1½" (3.81) |
| 3P | 300 | 15.00 (38.1) | .600 | 9.750 (24.77) | .650 (1.65) | 16.25 (41.28) | 1½" (3.81) |
| 3I | 300 | 11.50 (29.21) | .483 | 9.025 (22.92) | .836 (2.19) | 19.92 (50.60) | 1½" (3.81) |
| 4P | 300 | 14.875 (37.78) | .583 | 8.125 (20.64) | .546 (1.39) | 13.93 (35.38) | 1½" (3.81) |
| 4I | 300 | 11.625 (29.52) | .437 | 8.812 (22.38) | .757 (1.92) | 20.179 (51.25) | 1½" (3.81) |
| 5P | 300 | 15.375 (39.05) | .516 | 15.5 (39.37) | 1.008 (2.56) | 30.03 (76.28) | ½" (1.27) |
| 5I | 300 | 11.750 (29.85) | .453 | 16.6 (43.16) | 1.418 (3.60) | 36.55 (92.84) | ½" (1.27) |
| 6P | 300 | 14.75 (37.47) | .550 | 11.75 (29.85) | .796 (2.02) | 21.36 (54.25) | 1" (2.54) |
| 6I | 300 | 15.03 (38.18) | .637 | 18.937 (48.1) | 1.0625 (2.70) | 25.67 (65.20) | 1" (2.54) |
| 7P | 300 | 14.375 (36.51) | .508 | 11.31 (28.73) | .787 (2.00) | 22.28 (56.59) | 1" (2.54) |
| 7I | 300 | 14.479 (36.78) | .563 | 14.13 (35.89) | .978 (2.48) | 25.08 (63.70) | 1" (2.54) |

NOTE:
[1]P = Prior Art Electrode
I = Inventive Electrode
[2]All Samples Cut Were Mild Steel.
[3]( ) centimeters From the foregoing Table it is apparent that electrodes according to the present invention and in particular to FIGS. 1 and 2 resulted in significantly better performance than those of the prior art. In the category of Cut Per Inch of Electrode Consumed the inventive electrodes were unanimously better than those of the prior art. All tests except for number 3 were run with electrical current being fed to the electrode during the entire test. In the case of test number 3 after cutting began on the test sample the power was turned off and cutting continued. In test number 3 it is apparent that the inventive electrodes were superior since they had a significantly better overall performance for the length of electrode consumed. It is believed the inner tube insures that a jet of oxygen and flame of burning metal hits the workpiece with concentrated force thus the inventive electrodes performed better than the prior art electrodes.

Figure 3:
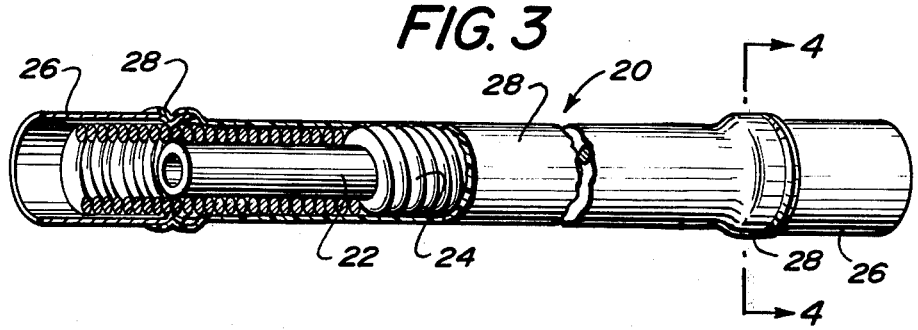
FIG. 3 is a perspective view partially fragmented of an alternate embodiment of the electrode of FIG. 1.
Figure 4:
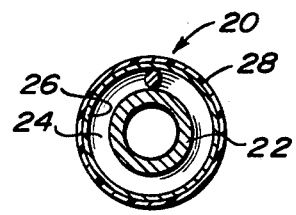
FIG. 4 is a cross-sectional view taken along the lines of 4—4 of FIG. 3.

FIGS. 3 and 4 disclose an alternate embodiment of the present invention wherein the electrode 20 includes a central tube 22 of low carbon steel having a 0.187 inches (~4.75 mm) outside diameter and a 0.130 inches (~3.30 mm) inside diameter. Wrapped around tube 22 is a continuous helix of 0.062 inches (~1.57 mm) diameter steel wire 24. On either end of the electrode 20 a steel ferrule 26 is crimped over the wound wire 24 the ferrule having an axial length of 1.5 inches (~3.81 cm), a 0.375 inches (~9.53 mm) outside diameter and a 0.319 inches (~8.10 mm) inside diameter. Between the ferrules covering the exposed wound wire 24 is a plastic coating 28 similar to the coating used on the electrode of FIG. 1. Electrodes according to FIGS. 3 and 4 were tested and found to perform satisfactorily. As long as the hot metal spatter was not excessive and did not adhere to and burn through the plastic coating an electrode of this type will perform satisfactorily. As with the electrode of FIGS. 1 and 2 the ferrule 26 project beyond one end of the wire 24 and wire 24 projects beyond one end of inner tube 22 thus defining the torch end of the electrode.

FIGS. 5 and 6 show another electrode 30 according to the present invention. Electrode 30 includes a central or inner tube 32 of low carbon steel having a 0.131 inches (~3.33 mm) inside diameter and a 0.187 inches (~4.75 mm) outside diameter. Disposed around inner tube 32 are a plurality (in this case 12) of rods 34 each of a low carbon steel having a 0.062 inches (~1.57 mm) diameter. Crimped to either end of the wire bundle disposed around inner tube 32 are a pair of steel ferrules 36 and 37 which are fabricated from a low carbon steel, each having a 0.375 inches (~9.53 mm) outside diameter and a 0.319 inches (~8.1 mm) inside diameter. Disposed between the ferrules 36 and 37 is a plastic coating 38 of the same type used for the electrode of FIG. 1. Alternatively, the ferrules 36 and 37 can be replaced by a single length of tubing. In either case, rods 34 should be recessed inwardly from one end of one ferrule (e.g. 36) and inner tube 32 should be recessed inwardly from the end of rods 34 on the same end of electrode 30 to define the torch end.

FIGS. 7 and 8 disclose still another embodiment of the present invention wherein the electrode 40 includes a center tube 42 and an outer tube 46 similar to those of FIG. 1. Disposed between the tubes is a third tube 44 having a heavy wall being selected so that it fits easily over center tube 42 and can be crimped into position by crimping outer tube 46. Crimping is done intermittently around the circumference to permit oxidizing gas to flow between the inner wall of outer tube 46 and outer surface of tube 44 as well as between the inner wall of tube 44 and outer wall of tube 42. As with the previous embodiments the next succeeding inner tube is recessed from its outer neighbor on one end of electrode 40 to define a torch end of the electrode.

FIG. 9 shows a cross-section of an electrode 50 which is an alternate embodiment of the electrode of FIG. 8 which includes a thin-walled inner tube 52, a thin-walled outer tube 54 both of which can be similar to the tubes used in the embodiments of FIGS. 1 or 7. The heavy-walled middle tube is replaced by a continuous wrap 56 of a thin sheet material which can be rolled onto to inner tube 52 in a conventional manner. The wrap is sized so that the combined material will fit inside of the outer tube 54 and the outer tube can be crimped to hold the entire structure in place. As described above, the electrode is constructed with recessed inner portions on one end.

As stated above, the electrodes according to the present invention can be provided with a continuous electrically insulating water impervious cover so that they can be used either above or below the surface of a body of water. In particular, the electrodes have been found to be very effective for under water use.

Using a construction according to the present invention assures that the steel components at the projecting end of the electrode (end opposite that clamped in the torch) are bathed in a stream of high-pressure oxygen. As the electrode is consumed, this intimate relationship between the mass of metal and the oxygen stream must remain for consistent performance. This is assured in the electrodes of the present invention by utilization of the inner tube which is heretofore not shown in the electrode constructions delineated in the prior art.

As described above, each electrode is constructed so that the outer tube or ferrules project over one end of the mass of metal (e.g. spring wound wire) which in turn projects over the inner tube. This construction defines a torch end of the electrode that acts as a manifold so that the oxidizing gas flows mainly through the inner tube. Oxidizing gas is also directed through passages between the inner wall of the outer covering (tube or vinyl) and the mass of metal and between the outer surface of the inner tube and the adjacent surface of the mass of metal.

In some cases it may be advantageous to provide a like recess on the burning end of the electrode to: provide space for oxygen coming through the center tube to diffuse laterally into an annular ring which facilitates ignition of the end of the electrode.

In the case of the embodiment of FIGS. 1, 2, 3 and 4 both the tube and the helical wrap around the inner tube may be recessed from the projecting end of the electrode in order that all parts of the electrode are bathed in oxygen making it easy to initiate the flame and maintain consistent performance of the electrode as it is consumed.

STATEMENT OF INDUSTRIAL APPLICATION

Electrodes according to the present invention can be used on dry land but find excellent utility for under water use. As is well known in the trade, divers performing under water cutting operations are paid premium wages and must have reliable electrodes. They must also have electrodes which will cut efficiently per unit of electrode consumed. Such electrodes are disclosed in the foregoing specification which have been shown to out perform current state of the art electrodes of the multiple wire type.

Having thus described our invention what is desired to be secured by Letters Patent of the United States is set forth in the accompanying claims.

I claim:

1. An exothermic cutting electrode for use on land or underwater of the type comprising a metal tube within which are disposed a plurality of elongated metallic rods or wires the electrode adapted to be held by a torch for conducting electrical current to said electrode and a gaseous oxidant through said electrode for ignition and continuation of combustion of the free end of said electrode producing a high temperature flame whereby said electrode and said flame can be brought into contact with a workpiece for performing a cutting operation thereon the improvement comprising:
   an inner tube of a metal of the same general type as said outer tube, said inner tube disposed within and spaced apart from said outer tube thus defining an annulus between said tubes;
   a mass of metal disposed in said annulus said metal being of the same general type of metal as said inner and outer tubes said electrode constructed to cause flow of gaseous oxidant through said inner tube to produce a jet of oxygen and flame at the free end of said electrode.

2. An electrode according to claim 1 wherein on one end thereof said outer tube projects over said mass of metal and said mass of metal projects over said inner tube to define a torch end manifold.

3. An electrode according to claim 1 wherein said mass of metal is formed by disposing a plurality of elongated wires or rods in said annulus said rods or wire oriented with their length parallel to outer surface of the inner tube.

4. An electrode according to claim 1 wherein said mass of metal is formed by continuously wrapping a wire around said inner tube in a continuous helix.

5. An electrode according to claim 4 wherein said wire is wrapped in a continuous helix where each turn of said helix is adjacent the previous turn of said helix.

6. An electrode according to claim 1 wherein said mass of metal is formed by thin sheet metal wrapped around said inner tube.

7. An electrode according to claim 6 wherein said thin sheet metal is a continuous sheet.

8. An electrode according to claim 1 wherein said mass of metal is a middle tube adapted to fit over said inner tube and inside said outer tube said middle tube having a relatively thick wall.

9. An exothermic cutting electrode comprising in combination:
   a fluid oxidant passage tube of electrode length, said tube of an oxidizable metal;
   a mass of a similar metal disposed around said fluid oxidant passage tube said mass of metal sized to provide an oxidative reaction which in turn produces temperature sufficient to provide a flame for cutting materials of consturction;

means to hold said mass of metal in intimate contact with the outer surface of said tube; and an electrically insulating water impervious coating over the electrode, said coating easily removable from the ends of said means to hold said mass of metal to facilitate initiation of oxidation of said tube and metal mass.

10. An electrode according to claim 9 wherein said means to hold said mass of metal includes a pair of ferrules positioned over the opposite ends of said inner tube and said mass of metal with said insulating coating extending between said ferrules.

11. An electrode according to claim 9 wherein said means to hold said mass of metal includes an elongated tube of a length greater than said fluid oxidant passage tube or said mass of metal.

12. An electrode according to claims 10 or 11 wherein said holding means on one end of said electrode projects over said mass of metal and said mass of metal projects over said fluid oxidant tube.

13. An electrode according to claim 9 wherein said mass of metal includes a plurality of elongated wires or rods disposed around said tube with their longitudinal axes arranged parallel to the outer surface of said tube.

14. An electrode according to claim 9 wherein said mass of metal includes a continuous wire helically wound around said tube.

15. An electrode according to claim 9 wherein said mass of metal includes a thick walled tube adapted to fit over said fluid tube.

16. An electrode according to claim 9 wherein said mass of metal includes thin sheet metal wrapped around said fluid oxidant passage tube.

* * * * *